Figure 1:
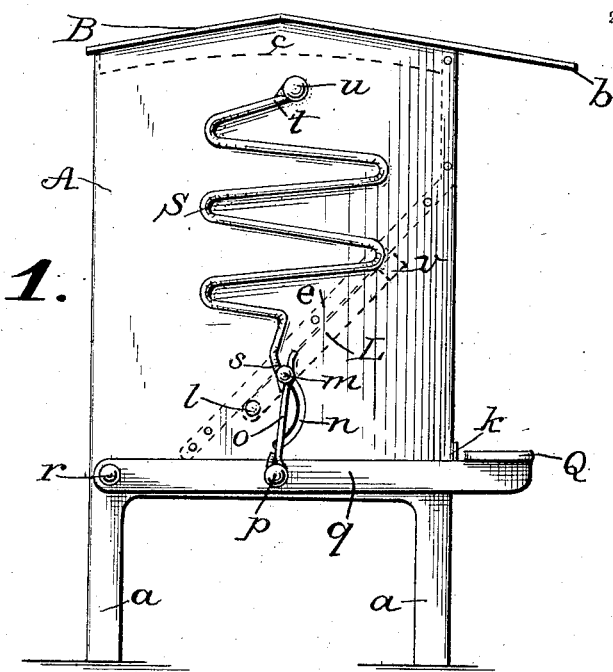

C. E. STACY.
AUTOMATIC FOOD PROTECTING AND FEEDING DEVICE FOR CHICKENS.
APPLICATION FILED SEPT. 14, 1912.

1,053,447.

Patented Feb. 18, 1913.

2 SHEETS—SHEET 1.

WITNESSES:
Samuel Sipe.
Samuel L. Herman.

INVENTOR:
Charles E. Stacy,
BY
Frank M. Burnham
ATTORNEY.

C. E. STACY.
AUTOMATIC FOOD PROTECTING AND FEEDING DEVICE FOR CHICKENS.
APPLICATION FILED SEPT. 14, 1912.
1,053,447.
Patented Feb. 18, 1913.
2 SHEETS—SHEET 2.
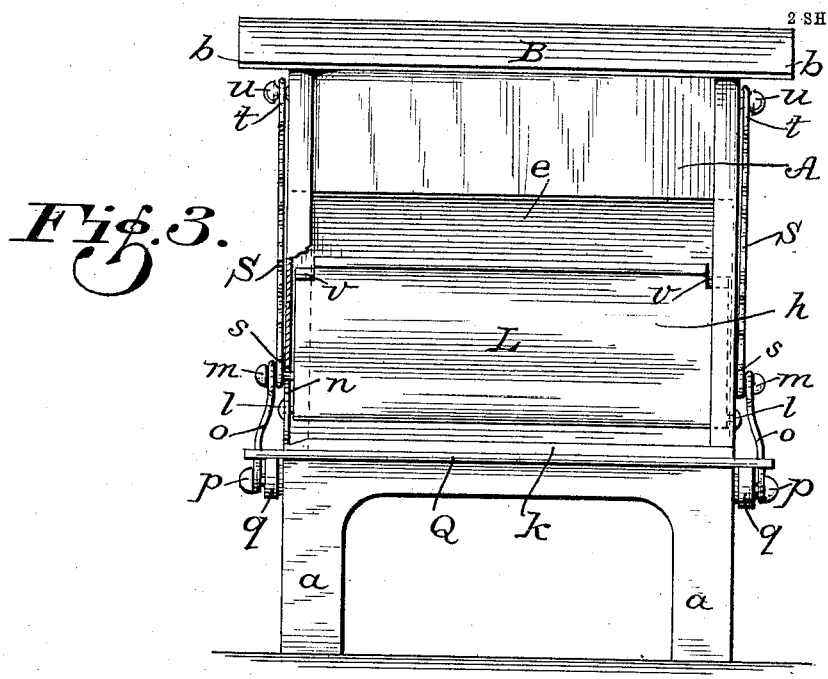
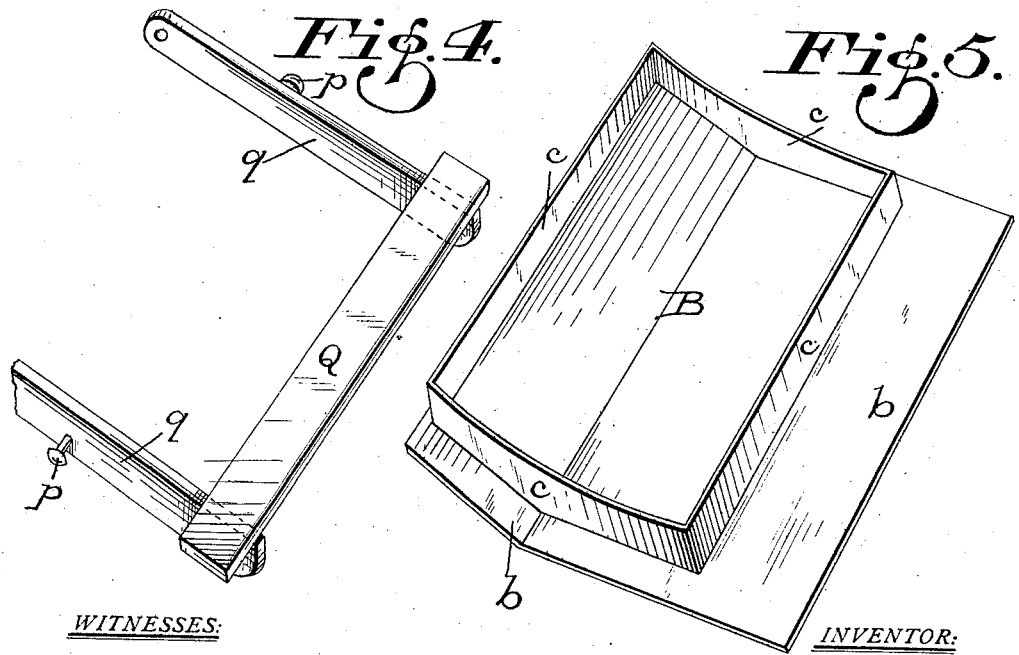
WITNESSES:
Samuel Sipe.
Samuel L. Harman.
INVENTOR:
Charles E. Stacy,
BY
Frank M. Burnham
ATTORNEY.

UNITED STATES PATENT OFFICE.

CHARLES E. STACY, OF HARRISON TOWNSHIP, MONTGOMERY COUNTY, OHIO.

AUTOMATIC FOOD PROTECTING AND FEEDING DEVICE FOR CHICKENS.

1,053,447. Specification of Letters Patent. Patented Feb. 18, 1913.

Application filed September 14, 1912. Serial No. 720,347.

*To all whom it may concern:*

Be it known that I, CHARLES E. STACY, a citizen of the United States, residing at Harrison township, in the county of Montgomery and State of Ohio, have invented certain new and useful Improvements in Automatic Food Protecting and Feeding Devices for Chickens, of which the following is a specification.

My invention relates to an "automatic food protecting and feeding device for chickens"; and is a separate and distinct invention from any class of feeding devices provided with mechanism operated by hand; thereby setting forth an entirely different mechanical construction therefrom; as the operation and mechanism of my device is automatic throughout.

Some of the principal objects of my invention consist in providing a device that will automatically deliver or serve food or feed;—such as grain and corn,—to chickens and other fowls, thereby preventing the wasting of said feed, thus making said device of special advantage especially when raising young chickens.

Another object is to provide said device with means for automatically protecting the food from being stolen by rats, mice or small birds; thereby furnishing the food to said chickens or fowls to the exclusion of all other animals.

Another object is to so construct said device as to protect the food from injury by rains, heavy dews or similar atmospheric conditions.

Another object is to provide a feeder for chickens, that will always remain clean and in a sanitary condition, thus keeping the food fresh and wholesome.

Further objects are to provide a device as above referred to, that is very efficient giving better results generally; that is composed of few parts; is simple in its construction; and one which can be manufactured at a minimum cost and therefore is inexpensive.

This invention consists essentially, referring briefly and in general terms to the structure covering my automatic food protecting and feeding device for chickens; of the very peculiar construction, arrangement and combination of the various mechanical parts or elements and the minor details thereof, which will hereinafter be elaborately described in detail and set forth in the subjoined claims, all in accordance with the statutes in such cases.

Referring to the accompanying drawings constituting a formal part of this specification, and illustrating one form of construction for carrying out the objects and principles of my invention, and wherein the same reference letters are utilized to indicate and point out the same parts wherever occurring throughout the several views:—

Figure 2:
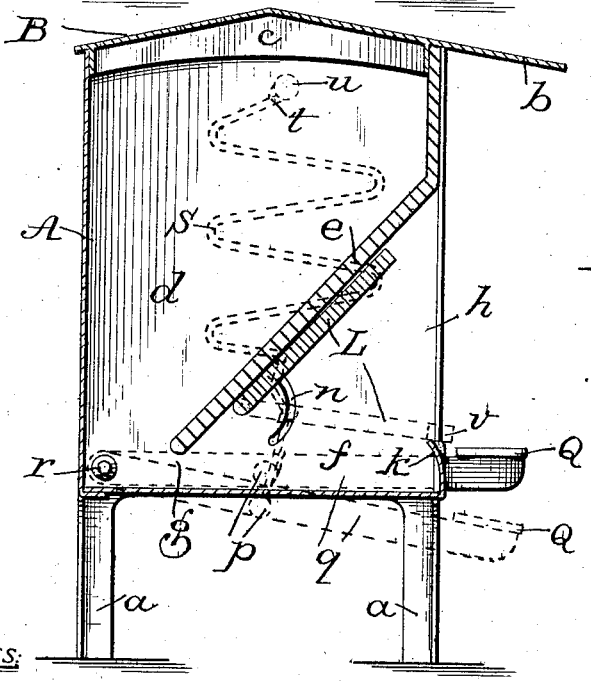

Figure 1 is an end view of my device—partially shown in dotted lines,—when the parts are in their normal position with the feed-compartment opened: Fig. 2 is a vertical transverse sectional view of same, showing in dotted lines the position the parts assume with the feed-compartment closed: Fig. 3 is a front elevation of the device as shown in Fig. 1. Fig. 4 is a perspective view of the automatic platform and its movable side arms or supports—one of which is partially broken away;—and Fig. 5 is a perspective view of the combined roof and lid or cover,—looking at the under side or face of same.

In describing my said invention specifically, and referring in detail to the various parts or features of construction which in combination make up my automatic food protecting and feeding device for chickens, as shown throughout the several views of the drawings and indicated therein by means of the characters of reference as aforesaid:—A refers to the body of the device which may be of any suitable shape or contour desired, having the legs or standards $a$ by which it is supported at a proper height, and is provided with a combined roof and cover B, the front and ends or wings $b$ of the inclined top of which extend any suitable distance desired beyond said body portion, thus acting as a water shed adapted to carry off all water caused by rain, snow or any form of moisture, thereby shielding the open front leading to the feed-compartment and protecting the food therein from injury. As more fully shown in detail in Fig. 5, said roof is provided on its inner and under face with a flange $c$, and when said roof is in position, said flange will impinge against the interior face of the sides or walls of the storage or supply-compartment $d$, sufficiently snug to hold said roof firmly in position, forming a slip joint connection therewith and allowing of the ready removal of same when it is desired to place a supply of grain or corn in the storage-compartment, thus adapting said roof to also act as a cover or lid to said storage-compartment.

Storage compartment $d$ is somewhat hopper shaped, and is formed by means of an inclined division wall $e$, which separates it from the feed-compartment $f$, leaving a passageway or open communication $g$ between said compartments, which allows the food—usually screenings or some class of dry mash,—as fast as consumed out of feed-compartment $f$, to gravitate from said storage-compartment through passageway $g$ into said feed-compartment, thus always automatically furnishing food to the chickens.

The chickens or fowls are enabled to readily reach the food in the feed-compartment, through opening $h$ in the front of the device, which is of a suitable size and located a proper height from the ground or floor.

Feed-compartment $f$ is formed with a curved wall $k$ by which the food is more readily retained therein and prevented from rolling out therefrom.

Movably connected to each of the two end walls of body $A$, by means of a pivot $l$ journaled therein, is a trap-door L, which is provided at each end with a supporting pin $m$, each of which projects through one of each of the slots $n$ located in each of said end walls of body $A$. Connected to the pin $m$—at each end of the device—is a link or arm $o$, the opposite end of which is connected to another pin $p$ projecting,—one from each of the movable arms or side pieces $q$ of the platform $Q$:—each of said movable arms is pivoted at $r$ to one of said end walls of body $A$. Also connected or hooked to each pin $m$ is the end $s$ of a spring or reacting member S, the opposite end $t$ of each of said springs is connected to a knob $u$ projecting from each of said end walls of body $A$; and it will here be observed and readily understood, that said springs are of just the proper strength and elasticity to support and hold trap-door L;—through the medium of its supporting pins $m$,—against division wall $e$, when in its normal position, as shown in dotted lines in Fig. 1, and solid lines in Figs. 2 and 3, thereby leaving feed-compartment $f$ open and readily accessible for the chickens;—while at the same time said springs—through the medium of links $o$, which are also connected to pins $m$;—will also support and hold platform Q raised when in its normal position, and in close proximity to the open feed-compartment $f$, so that if a rat, mouse or small bird should attempt to steal the food therein they would be forced to first get on said platform when their weight would be sufficient to press and carry said platform down, away from the open feed-compartment and causing the sensitive springs $s$ to expand and relax, allowing trap-door L to drop and the movable parts to automatically assume the positions so fully and clearly shown by dotted lines in Fig. 2, thus completely closing feed-compartment $f$ and covering all food therein, thereby protecting and preventing same from being stolen; the parts of course remaining in this position while said weight is on the platform, but as soon as this weight is removed, said parts will again assume their normal positions and said feed-compartment will again be opened to the chickens and fowls.

Trap-door L is formed at each upper corner with a recess $v$ to allow it to pass and avoid the side strips of the front opening $h$,—see Fig. 3,—when resting on curved wall $k$ in closing the feed-compartment as just described: see dotted lines in Fig. 2.

Having now described my automatic food protecting and feeding device for chickens,—in connection with the illustrations,—as new and as my invention: I claim—

1. An automatic food protecting and feeding device for chickens, having;—a storage-compartment; a cover to said storage-compartment; a feed-compartment adapted to automatically receive food from said storage-compartment; a trap-door leaving said feed-compartment opened and accessible when in its normal position; and a spring controlled platform connected to the device and adapted to automatically operate said trap-door so as to close said feed-compartment; substantially as described.

2. In an automatic food protecting and feeding device for chickens; a supply-compartment; a removable lid to said supply-compartment; a feed-compartment communicating with said supply-compartment; a trap-door movably connected to the end walls of the device; springs each connected at one end to the device and the opposite end having a connection with said trap-door; and a platform the arms of which are movably connected to the device and adapted to operate said trap-door so as to automatically cover and uncover said feed-compartment; substantially for the purposes and in the manner described.

3. An automatic food protecting and feeding device for chickens, comprising;—a suitably supported body; a storage compartment within said body; a roof constituting a cover to said body and said storage-compartment, having wings extending beyond said body; a feed-compartment within said body; a trap-door movably supported within said body; reacting members connected to said device also to said trap-door; and an automatic platform controlled by said reacting members; all substantially in the manner and for the purposes specified.

In testimony whereof I affix my signature in presence of two witnesses.

CHARLES E. STACY.

Witnesses:
ALLEN C. McDONALD,
CHARLES A. O'BRIEN.

Copies of this patent may be obtained for five cents each, by addressing the "Commissioner of Patents, Washington, D. C."